Feb. 20, 1934.                G. H. TREMOLIERES              1,948,404
                       MECHANICAL POWER TRANSMISSION CHAIN
                         Filed Jan. 26, 1931         2 Sheets-Sheet 1
Fig. 1
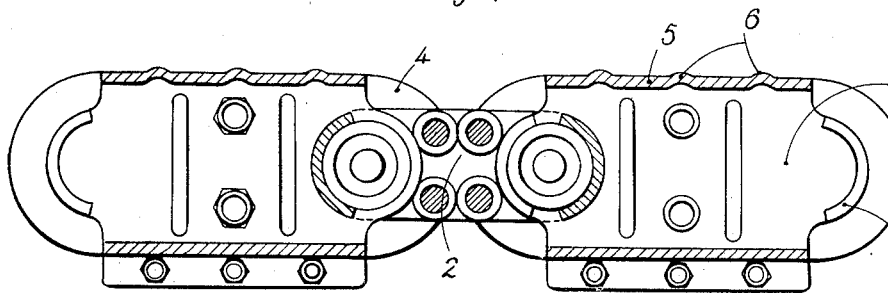
Fig. 2
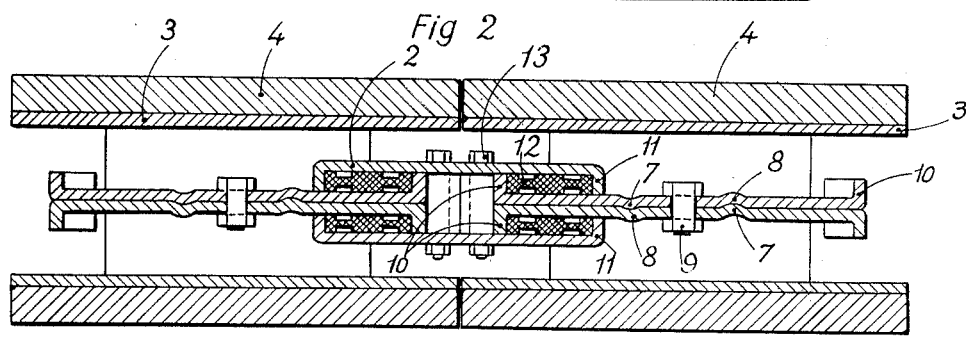
Fig 6   Fig 7   Fig 8   Fig 9   Fig 10   Fig 11
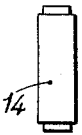  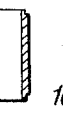  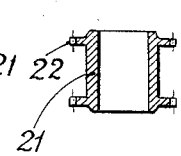 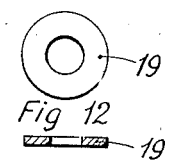
Fig 12
Fig 14
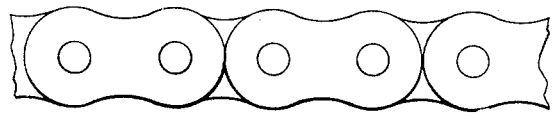
Fig 15
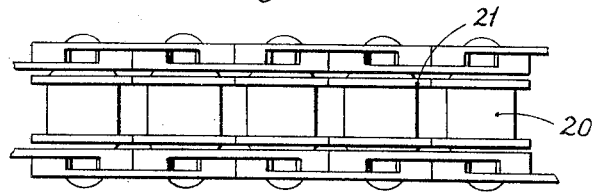
G. H. Tremolieres
INVENTOR
By Marks & Clerc
Attys.

Feb. 20, 1934. G. H. TREMOLIERES 1,948,404
MECHANICAL POWER TRANSMISSION CHAIN
Filed Jan. 26, 1931 2 Sheets-Sheet 2
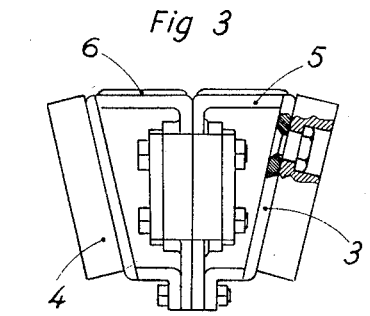
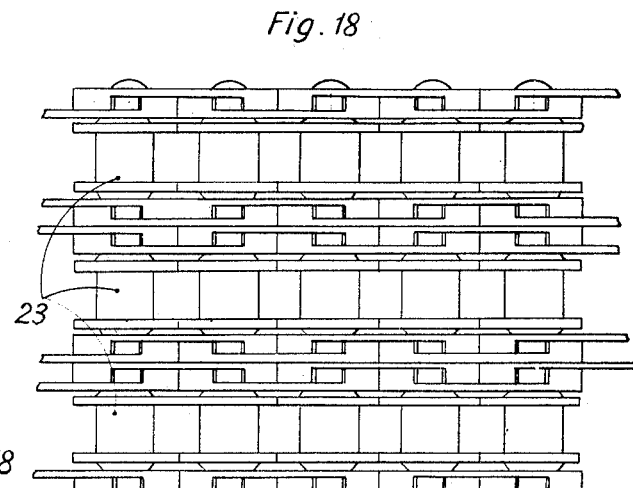
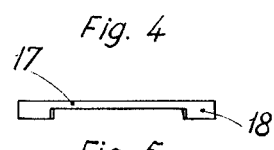
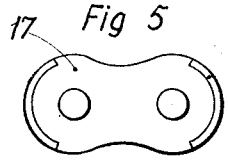
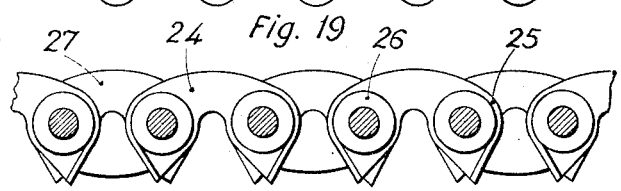
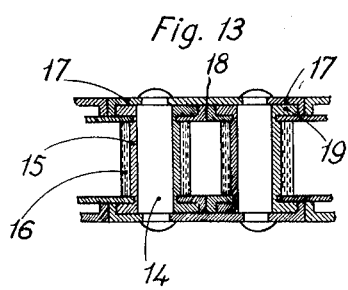
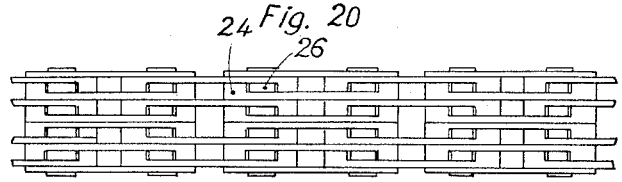
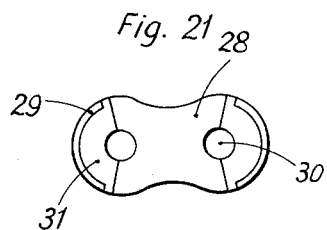
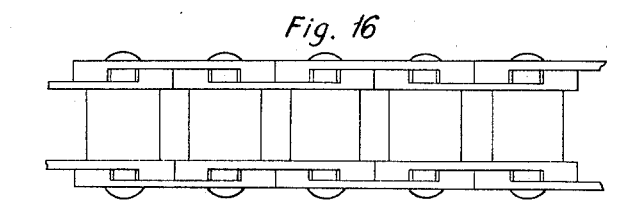
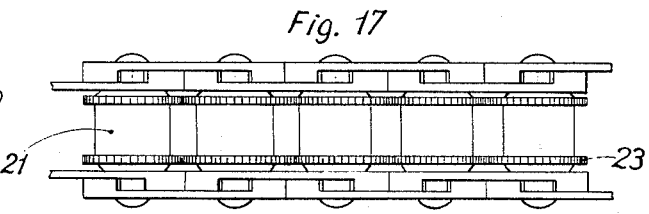

Patented Feb. 20, 1934

1,948,404

UNITED STATES PATENT OFFICE 1,948,404

MECHANICAL POWER TRANSMISSION CHAIN

Gustave Henri Tremolieres, Neuilly-sur-Seine, France

Application January 26, 1931, Serial No. 511,389, and in France April 22, 1930

4 Claims. (Cl. 74—32)

This invention relates to mechanical power transmission chains and is an improvement in or modification of the invention set forth in the specification of U. S. application Sr. No. 287,559 dated June 22d, 1927. The present invention relates to improvements in chains and belts of the said type consisting in hooking the separate links together by the intermediary of friction rollers, whereby it is possible to dispense entirely with the pins about which the links turn.

In order that the said improvements may be clearly understood constructions will be described with reference to the accompanying drawings, in which Figs. 1 and 2 show a belt according to the invention, seen respectively in longitudinal section on its plane of symmetry and in perpendicular longitudinal section.

Fig. 3 is a side view of a link of the belt shown in Figs. 1 and 2.

Figs. 4 and 5 show in side and front view the link employed for the chains with the rollers proposed by the present invention.

Figs. 6 and 7 show the pin and the tube used for attaching the rollers.

Figs. 8, 9 and 10 show three shapes of rollers; without collar, with plain collar, with toothed collar.

Figs. 11 and 12 show in plan and in section a roller by the use of which the links transmit the power by their peripheral surfaces.

Figs. 13, 14 and 15 show respectively in longitudinal section, in elevation and in plan a piece of chain with ordinary rollers.

Figs. 16 and 17 show in plan in the same way as Fig. 15 chains with rollers provided with plain collars (Fig. 16) and with toothed collars (Fig. 17).

Fig. 18 shows a triple chain constituted by three elementary chains similar to that of Fig. 16, the rollers of each elementary chain being in line with those of the adjacent elementary chains so as to be carried by the same pin.

Fig. 19 shows in elevation a type of silent chain according to the invention.

Fig. 20 is a plan view corresponding to Fig. 19.

Fig. 21 shows a modification of the construction of the chains or belts according to which the roller is replaced by two bearings in the shape of a sector of a circle and placed around a pin.

According to the invention the links of the chains and belts proposed abut against each other through the intermediary of rollers, which bear against circular surfaces of the circumference of the links.

By the use of these rollers it is rendered possible to dispense with any pin for rotation if so desired, however the pins may be retained, and then serve solely as guides.

Figs. 1 and 2 show the application of the invention to a trapezoidal belt constituted by the co-operation of two kinds of links; the main links 1 and the intermediate links 2. A main link has the shape of a rectangular trapezium the non-parallel sides of which enclose an angle of approximately 14°; each link can be attached to an identical link by its face perpendicular to the base of the trapezium so as to constitute the aggregate shown in Fig. 3, which shows an isosceles trapezium the non-parallel sides of which enclose an angle of 28°, and which is constituted by the union of two adjacent rectangular trapeziums by their sides perpendicular to the bases. Upon the sloping sides 3 there may be fixed strips of leather or any other suitable material for the purpose of adhesion; the upper base 5, that is to say the larger one may have projecting ribs 6. The contiguous faces of two adjacent links 1 may each be provided with two ribs one of which 7 projects outwards and the other 8 is recessed, the ribs of the two contiguous faces fit into each other, and it is to be noted that this arrangement necessitates only a single shape of link 1, for if two identical links be taken made as described above, it suffices to turn one over in order that its rib 7 may fit into the rib 8 of the other and reciprocally as shown in Fig. 2.

The contiguous faces are also held by bolts 9. At each of their ends the links 1 end in a flange 10 of circular arc shape and the adjacent ends of two successive main links are connected by an intermediate link 2 having also at each of its ends a flange 11 of circular arc shape in such manner that each flange 10 is associated with a flange 11 to constitute a seat in which a cylindrical roller 12 is located. The links 2 which thus come face to face are held by bolts 13. It will be noted that the covering strips of two successive links touch each other, obviating any gap between two of these links. It is evident that the arrangement shown in Figs. 1 and 2 possesses great simplicity of construction and necessitates only two types of stamped links, the main links being folded over so as to form a trapezium as above mentioned; it is evident also that the pins about which the links turn have been eliminated owing to the use of rollers for transmitting the power.

In Figs. 4 to 18 there is shown the application of the invention to roller chains. The fitting together of the rollers and links is carried out by means of a pin 14 shown in Fig. 6 and of a tube 15 shown in Fig. 7. The rollers 16 employed in the chain and shown in Fig. 13 are similar to that shown in Fig. 8. The links 17 have the shape shown in Fig. 5 and have a circular flange 18 at each end.

On referring to Fig. 13, it is seen that the pins 14 pass at each end through two links 17 arranged in reverse direction in such way as to provide between them a cylindrical seat around the end of the pin 14 in which is located the roller 19 shown in Figs. 11 and 12. It will be noted further that the adjacent ends of two consecutive links touch each other and can thus turn one against the other in the course of the relative movement of these two links; this arrangement of the links, which touch each other on each side of the space left free for the teeth, which have to engage with the chain, prevents the chain from jumping at high speeds. The completed chain has the appearance shown in Figs. 14 and 15.

In order to prevent more surely the chain from jumping, the rollers may be provided with collars which abut against each other and which are arranged on either side of the space left free for the gear teeth; thus Fig. 15 shows a roller chain 20 provided with collars 21 similar to that shown in Fig. 9. In order to facilitate the engagement of the collars with each other they may be provided with teeth as shown in Fig. 10, which shows a roller 21 having two toothed collars 22. This roller has been employed in the construction of the chain shown in Fig. 17.

The invention further proposes to construct a multiple chain constituted by the union of three elementary chains such as those shown in Figs. 15, 16 and 17, the rollers of these elementary chains being located in line with one another and attached to the same pin, it is thus that in the figure the rollers 23 are carried by one and the same pin the length of which is equal to the width of the chain.

In Figs. 19 and 20 there is shown a silent chain based on the same principle as the chains and belts already described. This chain is constituted by several rows of links of special shape 24 having at each end a flange 25 of circular arc shape in such manner that the opposite ends of two adjacent links provide between them a seat wherein there is located a roller 26 serving for transmitting the tractive forces. Furthermore the chain is provided laterally with guide plates 27, which may have the shape shown in the figures.

In Fig. 21 there is shown a slightly different arrangement from that hitherto proposed for the transmission of power by the periphery of the links. In this arrangement the link shown at 28 has as before at each end flanges 29 of circular arc shape so that the ends of two adjacent links provide between them a cylindrical seat, but this cylindrical seat is traversed by a pin 30. Furthermore at each end of a link there is attached to this link a let-in bearing 31, having the shape of a sector of a circle, the angle at the centre of which is a little less than 180°, so that this incomplete half-circle may co-operate with the corresponding half-circle of the adjacent link leaving however a certain amount of play between the two bearings. The purpose of this arrangement is to minimize the heating surface which would result from too large a bearing and to keep a chain fitting without wear, the play being able to be taken up by changing the bearings. Also it allows of having a pin of less size, and consequently of reducing the friction surfaces. In this arrangement the pin shares in the transmission of the tractive forces.

It is obvious that the constructive shapes above described and shown in the accompanying drawings have only been given by way of example without any limiting sense, and that various modifications may be made without departing from the scope of the invention.

I claim:

1. A mechanical power transmission chain comprising a plurality of links stamped from sheet metal and arranged in opposed and overlapping pairs, arcuate flanges on the opposite ends of each link, the flanges on successive overlapping links extending toward each other to form substantial vertical housings, pins connecting adjacent opposed and overlapping links in longitudinal relation, rollers mounted on said pins and seated in said housings, the outer surface of each arcuate flange being in intimate contact with the outer arcuate surface of the adjacent flange, and spacing rollers mounted on said pins between the opposed and overlapping pairs of links.

2. A mechanical power transmission chain comprising a plurality of links stamped from sheet metal and arranged in opposed and overlapping pairs, arcuate flanges on the opposite ends of each link, the flanges on successive overlapping links extending toward each other to form substantially vertical housings, pins connecting adjacent opposed and overlapping links in longitudinal relation, rollers mounted on said pins and seated in said housings, the outer surfaces of each arcuate flange being in intimate contact with the outer arcuate surface of the adjacent flange, spacing rollers mounted on said pins and arranged between the opposed and overlapping pairs of links, and substantially cylindrical abutment members mounted on the rollers and arranged in contacting engagement with the abutment members on adjacent rollers.

3. A power transmission chain as claimed in claim 2, wherein the abutment members are in the form of collars.

4. A power transmission chain as claimed in claim 2, wherein the abutment members are in the form of intermeshing gears.

GUSTAVE HENRI TREMOLIERES.